No. 866,908. PATENTED SEPT. 24, 1907.
C. R. BINNEY & J. L. WATKINS.
DRIVING GEAR FOR MOTOR VEHICLES.
APPLICATION FILED MAR. 21, 1907.

3 SHEETS—SHEET 1.

No. 866,908. PATENTED SEPT. 24, 1907.
C. R. BINNEY & J. L. WATKINS.
DRIVING GEAR FOR MOTOR VEHICLES.
APPLICATION FILED MAR. 21, 1907.
3 SHEETS—SHEET 3.
Fig. 4.
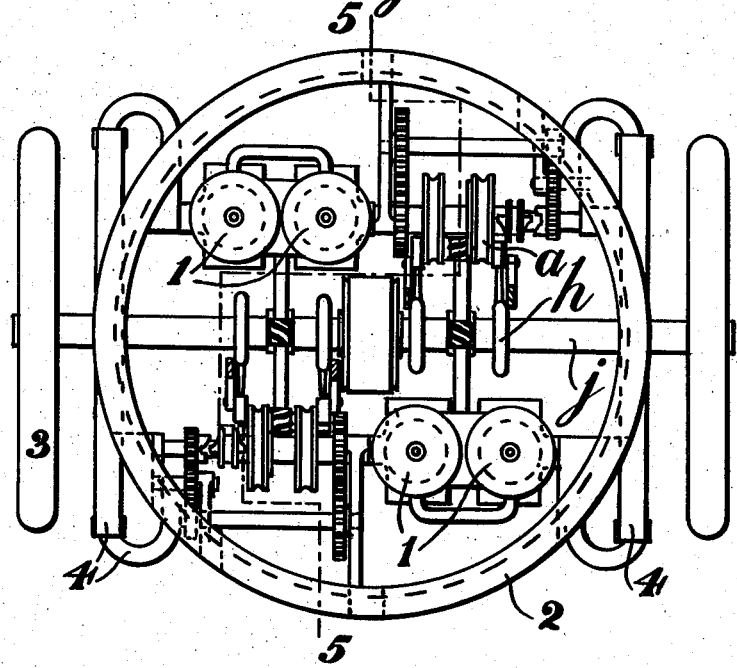
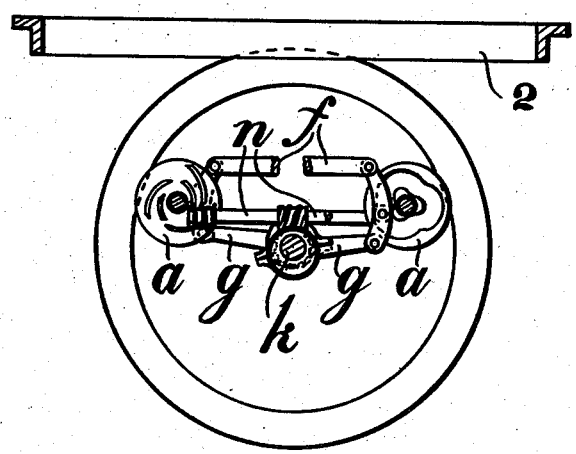
Fig. 5.
Witnesses:
L. E. Barkley
W. P. Lawson
Inventors
Charles R. Binney and
James L. Watkins

UNITED STATES PATENT OFFICE.

CHARLES RICHARD BINNEY AND JAMES LOGAN WATKINS, OF LONDON, ENGLAND.

DRIVING-GEAR FOR MOTOR-VEHICLES.

No. 866,908.      Specification of Letters Patent.      Patented Sept. 24, 1907.

Application filed March 21, 1907. Serial No. 363,981.

*To all whom it may concern:*

Be it known that we, CHARLES RICHARD BINNEY and JAMES LOGAN WATKINS, both citizens of the United Kingdom of Great Britain and Ireland, and residents of 5 Hackney road and 251 Clapham road, both in London, England, have invented certain new and useful Improvements in Driving-Gear for Motor-Vehicles, of which the following is a specification, such as will enable others skilled in the art to which it appertains to make and use the same.

Our invention relates to improvements in driving gear for motor vehicles and refers more particularly to that class of vehicle in which the engines are arranged within the fore carriage of the vehicle and drive the front wheels of the same.

The invention is very suitable for fore carriages of the circular type, without center or king bolts.

The invention consists in the use of a cam, in combination with a worm gear means being provided if desired to throw out or disconnect the worm gear if required. The cam is preferably of disk or plate form, and is driven by the engine and is arranged or constructed with one face having a depression or its equivalent, preferably a trefoil depression by which a lever is moved. The cam end of this lever is connected to one end of an arm the other end of which is pivotally attached to a fixed part of the frame or forecarriage. A roller is attached to the arm or lever and travels in the cam depression which as it rotates reciprocates the arm, thus obtaining the required movement of the eccentric the head of which is mounted on the shaft which it is required to drive. The other face of the cam (or a separate disk or plate on the same shaft) is provided with a series or set of teeth which engage a worm gear on the end of a shaft the other end of which also carries worm gear and engages and drives a toothed wheel on the same shaft as that driven by the eccentric. This worm gear shaft can be raised or the gear otherwise disconnected so that the cam drive only can be used. The cams may be arranged in duplicate, in triplicate or otherwise and a general or convenient method of mounting the parts is shown in the accompanying drawings in which:—

Figure 1:
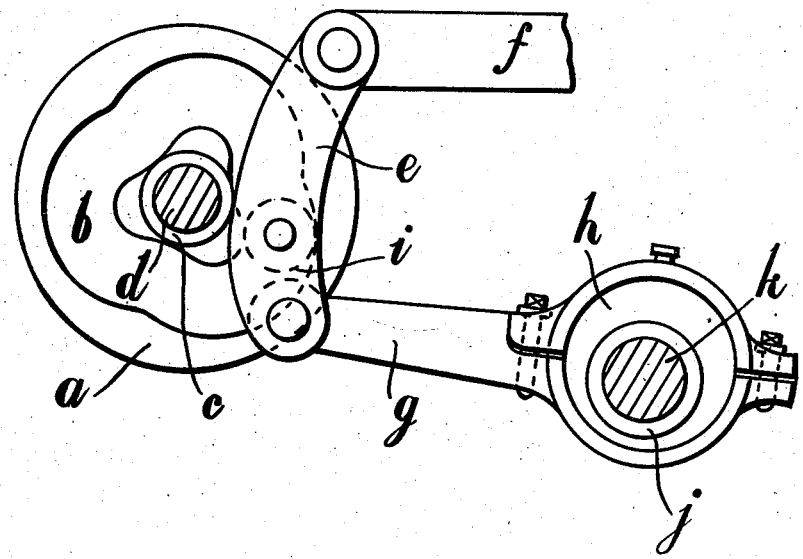
Figure 2:
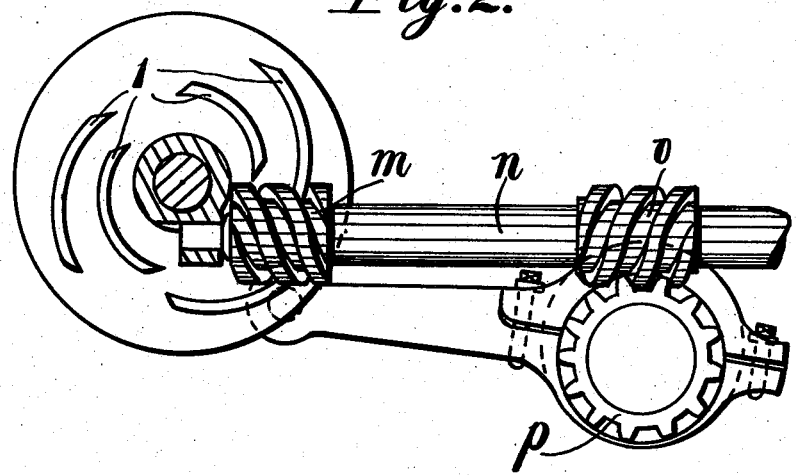
Figure 3:
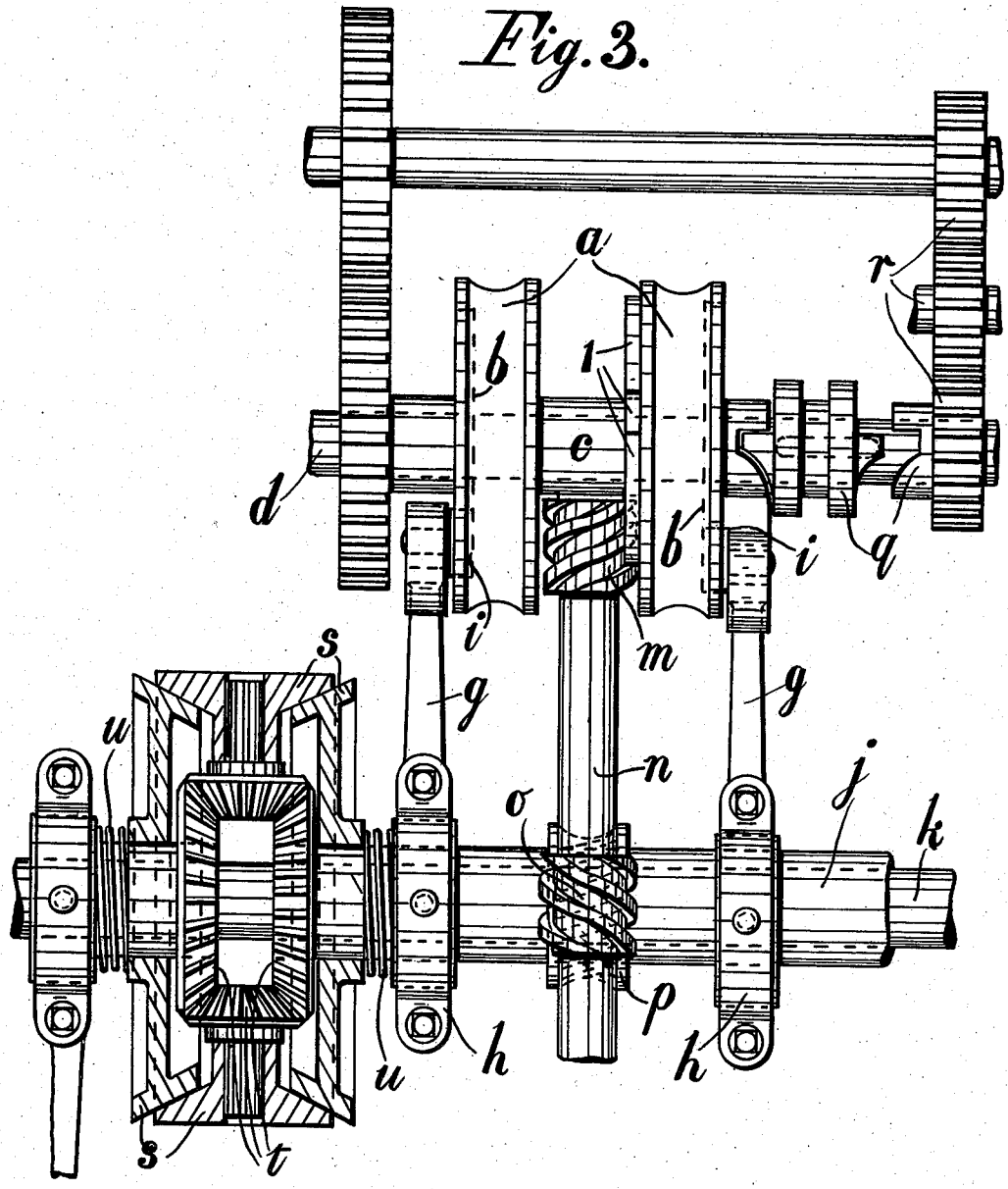

Figure 1, is a detail view in elevation of the cam and its intimate parts employed in this invention. Fig. 2, is a view taken on the reverse side to that shown in Fig. 1, certain parts thereof being omitted and others disclosed. Fig. 3, is a plan view of a pair of cams with eccentrics and one worm showing convenient relative position of these parts and of the engine shaft reversing gear and the clutch and differential gearing. Fig. 4, is a plan view of the gear arranged in a circular forecarriage and shows two pairs of engines, each driving a set of gear similar to that in Fig. 3. Fig. 5, is a sectional view on line 5—5 of Fig. 4.

In the drawings $a$, denotes a cam with the trefoil depression $b$, the cam is mounted by sleeve $c$ on shaft $d$. An arm $e$ is pivoted at one end to framework $f$ and at the other end to rod $g$ of eccentric $h$. This arm carries roller $i$ which travels in the depression $b$ as the latter rotates. The eccentric is mounted by sleeve $j$ on shaft $k$, which it drives through any convenient clutch and differential or other gear. On the opposite face of the cam (see Fig. 2) are the segments or teeth $l$ which drive worm $m$ on shaft $n$, which also carries a second worm $o$ adapted to drive the toothed wheel $p$ on the sleeve driven by the eccentric.

1, 1 are the engines or motors, which may be of any convenient type and drive the shaft $d$.

2 is the circular framework of the forecarriage the details of which and of the frame supporting the parts are omitted for the purpose of simplifying the drawings.

3 and 4 are respectively the road wheels and their springs.

A suitable clutch such as $q$ is employed to connect the sleeve $c$ to shaft $d$ and to the reversing gear $r$.

$s$ and $t$ are respectively the clutch with spring $u$ and the differential gear, which are shown inclosed in Fig. 4.

The direction of drive may be horizontal, as shown, vertical or otherwise and the shapes and arrangements of the parts may vary in any suitable and convenient way.

We are aware that cam driving gear has previously been employed for motor driving vehicles and we make no claim for the exclusive use of the cam gear.

What we claim and desire to secure by Letters Patent is.

In combination, a frame, a driven shaft carried thereby, an eccentric mounted on said shaft, a disk rotatably carried by the frame, said disk having a cam groove in one of its faces, a rod on the eccentric, an arm pivoted to the rod and to the frame, a roller carried by the arm to one side thereof intermediate its pivots to engage the cam, and additional means for rotating the driving shaft acting in conjunction with the opposite face of the disk.

In witness whereof we have hereunto set our hands in presence of two witnesses.

CHARLES RICHARD BINNEY.
JAMES LOGAN WATKINS.

Witnesses:
WALTER J. SKERTEN,
GEO. J. B. FRANKLIN.